Fig. 2ᵃ

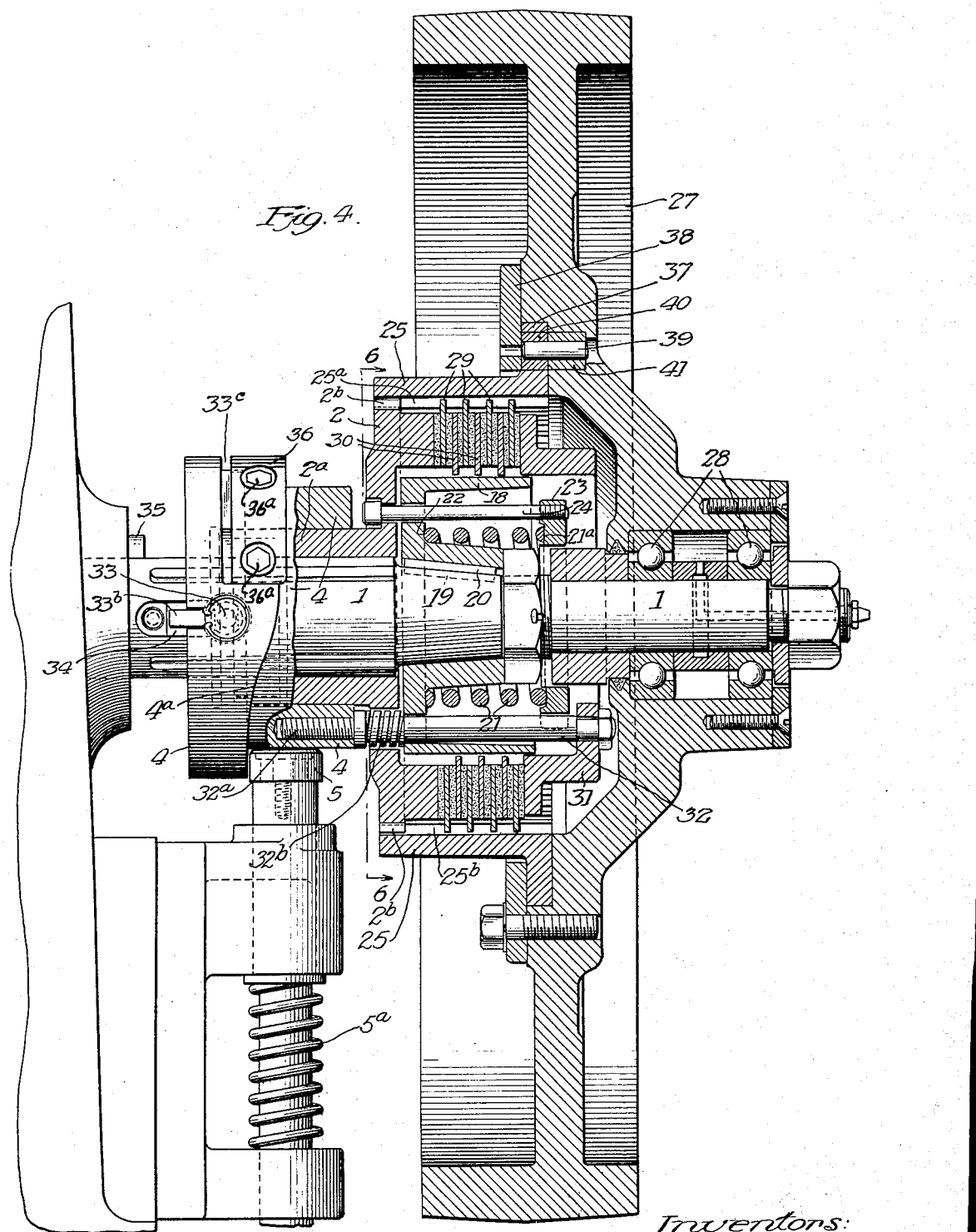

Aug. 31, 1937.   F. M. LITTELL ET AL   2,091,449
FRICTIONALLY SYNCHRONIZED POSITIVE DRIVE CLUTCH
Filed Jan. 3, 1933   4 Sheets-Sheet 4
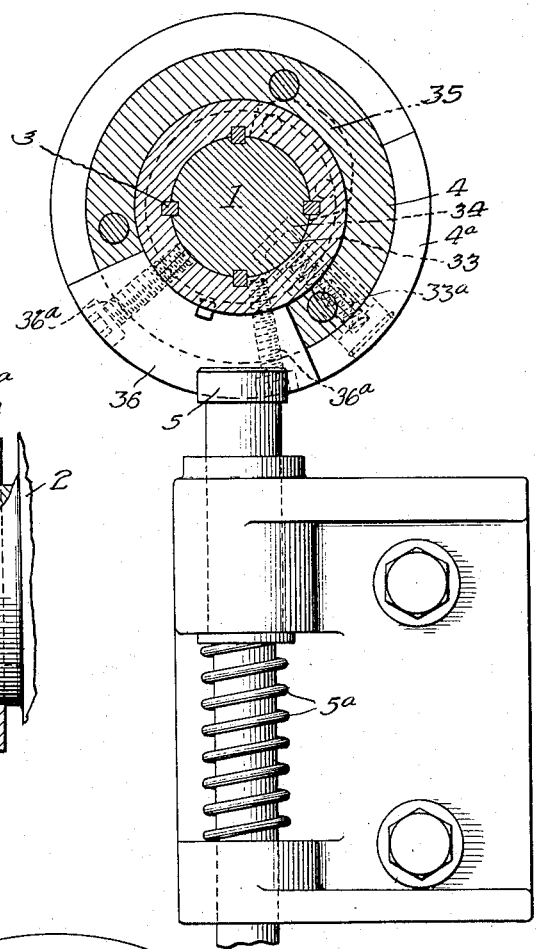
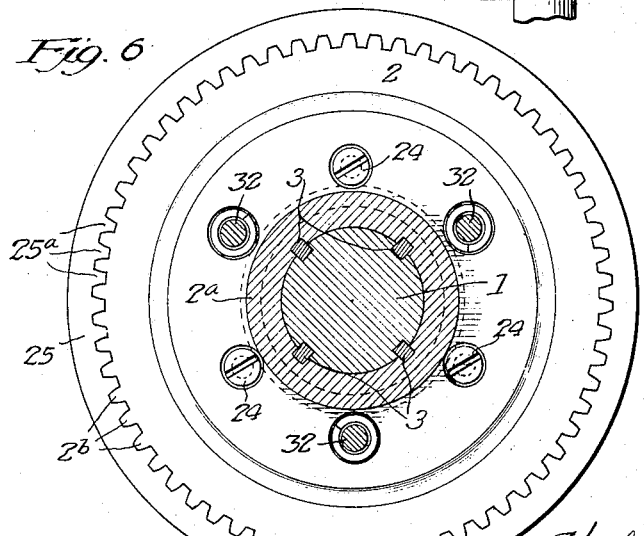

Patented Aug. 31, 1937

2,091,449

UNITED STATES PATENT OFFICE 2,091,449

FRICTIONALLY SYNCHRONIZED POSITIVE DRIVE CLUTCH

Frederick M. Littell and Rudolph A. Skriba, Chicago, Ill., assignors to F. J. Littell Machine Co., Chicago, Ill., a corporation of Illinois Application January 3, 1933, Serial No. 649,843

22 Claims. (Cl. 192—17)

This invention relates to clutches which embody in their organization positive or rigidly interlocking clutching means in order to avoid any possibility of slippage between driving and driven members; and has for its object to provide a non-positive clutching means automatically entering into driving relation to driving and driven members at the initial or pick-up stage of the drive which immediately follows the throwing in of the clutch, so that movement of the driven member will be brought to substantial synchronism with that of the driving member before the positive clutching means enters into operation and the severe shock which is imposed upon positive drive members as heretofore constructed will be entirely done away with; subordinate objects of the invention being to coordinate the non-positive and positive clutching means in such manner that the latter will follow automatically upon a predetermined amplitude of drive set up by the former; also to enable the non-positive clutching means to relinquish its drive at a time so related to the entry of the positive clutching means that it will, without sufficient interval for material loss of synchronism, permit the driven member to yield to a circumferential displacing movement under the intermeshing action of the positive clutching means and thus insure accomplishment of this last-named condition without shock to the parts; also to provide automatic declutching means and braking means to insure completion of a cycle of movement in the driven machinery when this is an incident to the operation of the machinery as in the case of punch presses, which must be brought to rest with their working plungers in a definite position.

In the drawings forming part of this specification, which illustrate a preferred embodiment of the invention—

Figure 1 shows an end elevation of the upper portion of a conventional punch press frame; a transverse section of a clutch driven crank shaft mounted thereon; a sleeve also in section slidingly splined on the said shaft and forming part of a driven member which carries external teeth constituting a part of a positive clutching means; a face view of a controlling collar which surrounds said sleeve and controls both non-positive or frictional clutching means and the aforesaid positive clutching means; a tripping plunger and its control cooperating with a cam on said collar to impart the controlling movements to the latter; and the band brake, in dotted lines, usually employed for arresting the driven shaft when employed in a punch press.

Figure 2a is a detail view of a portion of the interior surface of the driving member shown in Figure 2, and disclosing the beveled ends of the positive clutch teeth which facilitate interengagement with teeth on the driven member in establishing drive through the positive clutch.

Figure 4 shows, partly in elevation but mainly in section, the complete clutch with parts in the position occupied during positive clutch drive but at the instant of entry of the trip plunger into cooperation with the cam, so that by the ensuing fraction of a revolution the parts will be thrown into the position shown in Figure 2.

Figure 5 is a detail face view showing parts of Figure 1 in relative positions corresponding to the positions of Figure 2, and in which the cam of the controlling collar has completed its traverse of the plunger and left the latter in arresting abutment against the shoulder on the sleeve of the positively driven member.

Figure 6 is a face view revealed by a section on the line 6—6 of Figure 4; and

Figure 7 is a detail view of the latch carried by the controlling collar which extends through the sleeve of the positively driven member and enters a keeper in the driven shaft, the parts being shown in the position coinciding with that of Figure 2.

Figure 1:
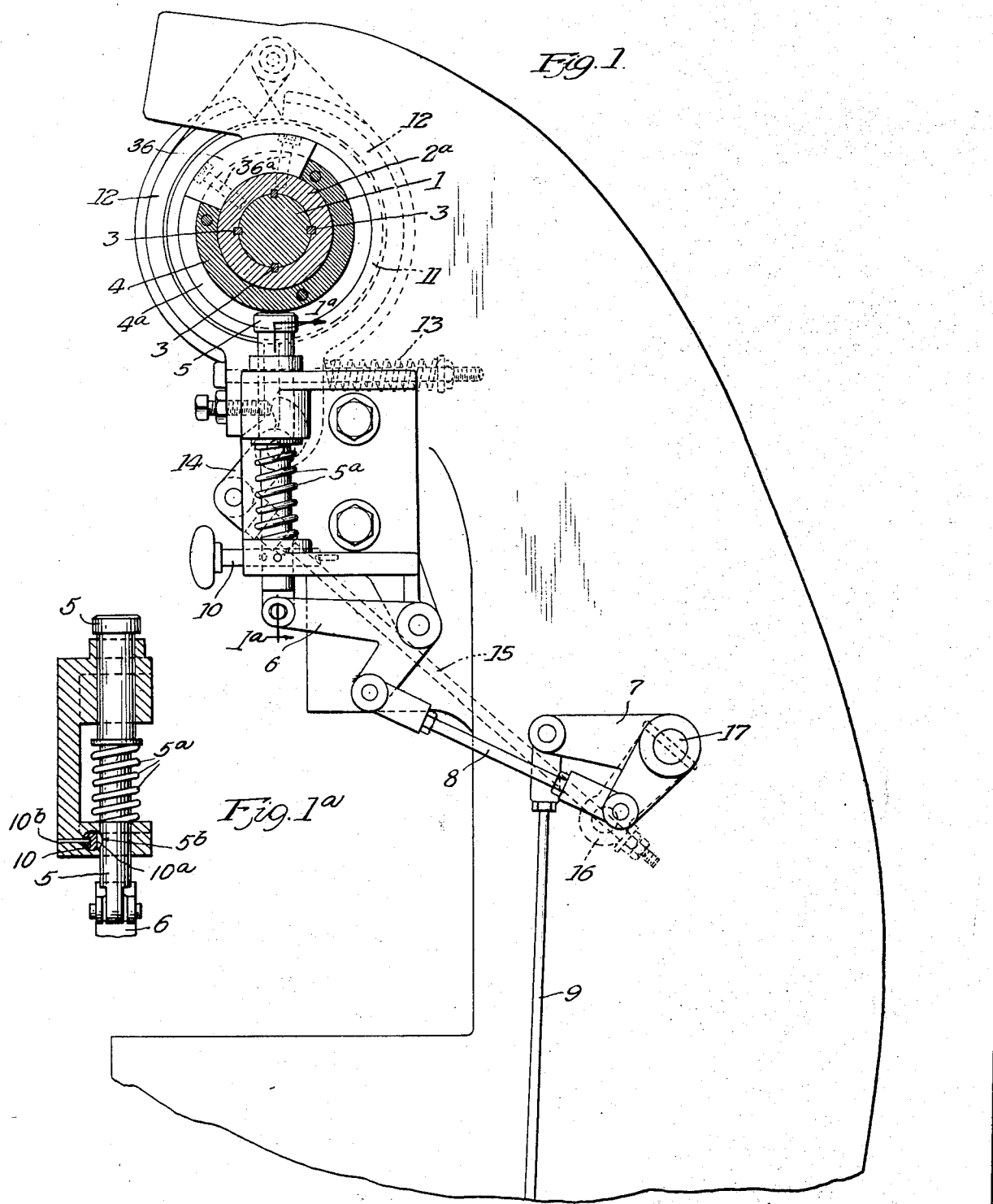
Figure 1a is a section on the line 1a—1a of Figure 1.

Referring to the drawings in detail, and more particularly to Figure 1, 1 represents a shaft which is intended to be driven by the clutch, for instance, the crank shaft of a punch press; 2a is a sleeve or shaft-fitting portion of positively driven member 2 of the clutch (Figures 2, 4, 6 and 7) which also serves as a compression member for the friction drive to be referred to; which said sleeve 2a is slidingly splined at 3 to the shaft 1; and 4 represents a control collar slidable upon the sleeve 2a and designed with a camming shoulder 4a traveling in a path which coincides with the protruded portion of the tripping plunger 5 which, while cooperating with this novel construction of control collar, is of itself conventional in that it is pressed to its duty by a spring 5a and is adapted to be withdrawn to free the control collar through the medium of any control connections, such, for instance, as bell crank levers 6 and 7 (Fig. 1) with their connecting rod 8 and pull rod 9 which may extend to the usual tripping pedal (not shown); said tripping plunger also being preferably equipped with detaining bolt 10 acting through means of notch interlock to hold the plunger down when continuous running is desired.

The construction of interlocking portions of the detaining bolt 10 and plunger 5 will be understood upon reference to Figure 1a, wherein the plunger 5 is shown at its downward limit with the spring 5a under compression ready to lift the plunger to the position shown in Figure 1 when the plunger is released. 5b represents a recess in the plunger 5 with which the detaining bolt 10 coacts to hold the plunger depressed. The detaining bolt 10 has a recess 10a which, when brought into registry with the recess 5b by the longitudinal displacement of the detaining bolt, leaves the plunger 5 free to move upward under the influence of its said spring. 10b represents a pin working in a slot in the detaining bolt 10 for limiting movement of the latter. If bolt 10 is drawn outwardly (manually) while plunger 5 is being held down through its foot controls 6, 7, 8, 9, the wide part of said bolt enters plunger recess 5b and holds the said plunger down and permits the clutch to continue its drive even though the said foot control be released. Manual inward thrust against the outer end of bolt 10 again registers the bolt recess 10a with the plunger and the latter is free to rise and arrest the drive. Further details of Figure 1 are the brake drum 11 and brake bands 12, 12 normally moved to braking position by means of spring 13 and releasing lever 14 under control of connecting rod 15 leading from the crank arm 16 on the same shaft 17 with the foot controlled bell crank 7, so that whenever the clutch is tripped by a drawing down of the plunger 5, the brake will be simultaneously released so that the automatic action of the clutch is free to ensue.

Figure 2:
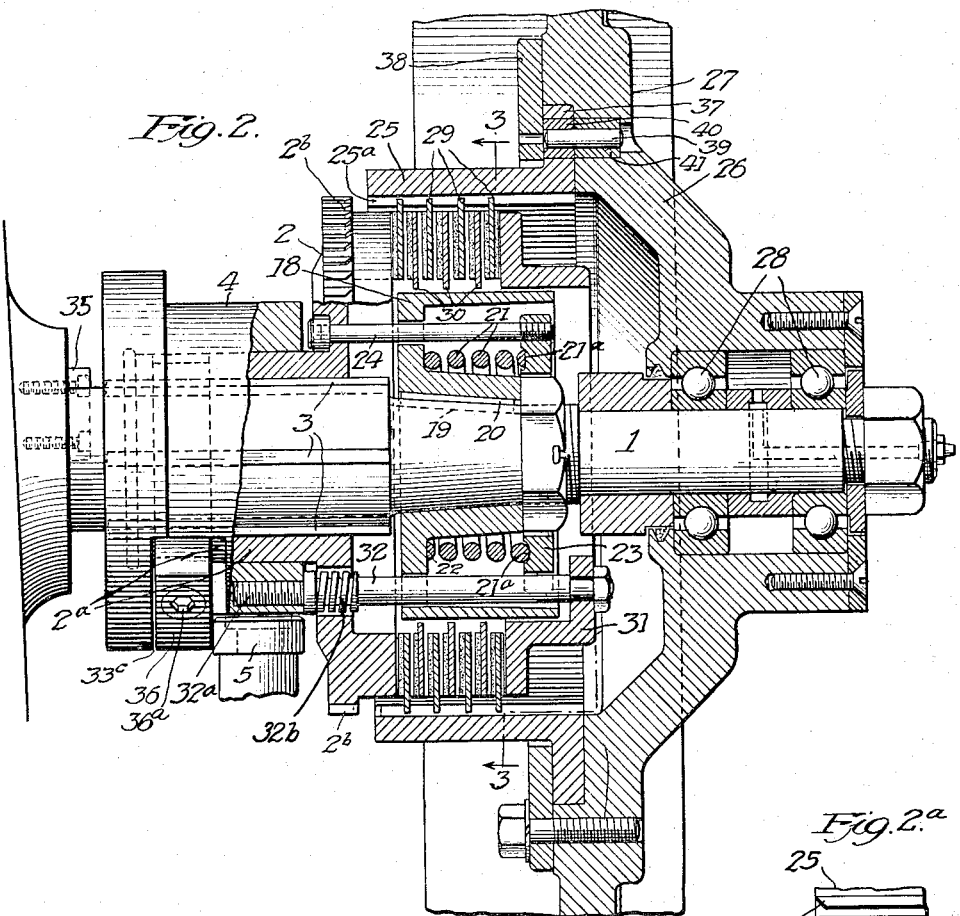
Figure 2 shows, mainly in axial section but partly in elevation, a complete clutch minus a portion of the tripping plunger and its controls; the parts being in positions occupied when drive is arrested.
Figure 3:
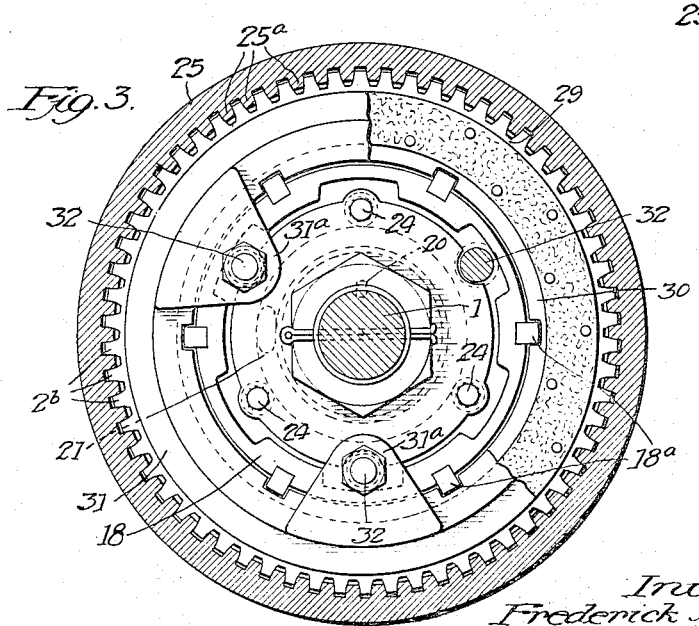
Figure 3 is a transverse section of Figure 2, taken on the irregular line 3—3, showing a portion of the friction clutch abutment and disclosing a friction ring beyond.

Referring more particularly to Figures 2 and 3, 18 represents a frictionally driven drum fixedly splined to shaft 1, both circumferentially and axially, by means of tapered seat 19 and spline 20, which said frictionally driven member also constitutes a spring box for clutching spring 21 which finds its stationary seat 22 at the closed end of said box and acts at its free end 21a against disk 23 which is connected by tension bolts 24 (see also Figure 4) with the positively driven member 2 of the clutch, which, as already explained, serves also as a compression member for the friction drive and, by said connections, translates movement of the spring 21 into clutching movement of the said member 2.

Cooperating with frictionally driven clutch member 18 and positively driven clutch member 2 is a driving member 25 of the clutch which is designed as a deep cylindrical or axially extending flange upon the hub 26 of the flywheel or drive pulley 27 which is rotatably mounted upon the shaft 1 in some suitable manner, such, for instance, as through anti-friction bearings 28. This driving member 25 has integral teeth 25a, and these teeth serve a dual purpose. First, they slidingly secure certain of the annular plates 29 of the friction drive, of which the co-acting annular plates 30 are similarly secured by splines 18a on driven member 18, thereby making the latter a frictionally driven member. Secondly, these teeth 25a are, under a certain movement of the positively driven member 2, caused to interlock with teeth 2b on the latter to establish positive drive of the clutch. Under an initial movement transmitted from spring 21 through disk 23 and rods 24 to the combined positively driven and compressing member 2, the stack of friction plates 29, 30 are pressed together so that members 25 and 18 are brought into frictional driving relation. This frictional drive takes place immediately after withdrawal of the tripping plunger 5, but movement of member 2 in the direction of compressing the elements of the friction drive is not at the moment of sufficient amplitude to bring the teeth 2b into mesh with the teeth 25a; hence, frictional drive alone exists during the first part of the resultant revolution of the driven elements. The cause of this limitation in the movement of member 2 is the arrest, for the instant, of the abutting ring 31 and the column of friction plates 29, 30, by tension bolts 32 which pass through said ring 31 and are tapped into collar 4, as shown at 32a; also the detention of said collar 4, for the time being, by latch 33, so that it cannot move under pressure of the friction rings against abutment ring 31 (see Figure 4). As shown in Figure 7, latch 33 is mounted in collar 4 and pressed by spring 33a into the keeper 34 embedded in the shaft 1. As soon, however, as the driven elements of the clutch, including shaft 1, have received part of a revolution under the frictional drive, during which approximate if not complete synchronism will have been established between the constantly running flywheel 27 and the now picked up crank shaft, the arm 33b of latch 33 will ride up upon the displacing cam 35 (see dotted lines, Fig. 5) mounted upon a stationary part of the frame, and the said latch will be withdrawn from keeper 34 and leave the hub 4 free to respond to pressure imposed upon abutment 31 through friction plates 29, 30, and the frictional driving assembly can then move as a unit under further reaction from spring 21 imposed through disk 23 and rods 24 upon member 2 until teeth 2b and 25a come into mesh, whereupon positive drive will have been established.

Spring 32b, shown on bolt 32 in Figures 2 and 4 and understood to be applied to the other two of said bolts (there being three of them, as shown in Figure 3), is adapted to encounter the hub of driven drum 18 and yieldingly limit forward movement of collar 4.

In order to facilitate intermeshing of the teeth that are to establish the positive drive, the ends of the teeth 2b and 25a, as shown in Figures 2 and 2a, are mitered, so that slight circumferential displacement between them will take place under the camming action of their abutment and thus facilitate their intermeshing.

33c represents a recess in the control-collar 4 that permits a friction controlling shoulder block 36 to be mounted directly upon sleeve 2a of the driven member 2, for instance, through means of screws 36a. This recess 33c is of such dimension in the direction of the axis of the clutch that there is such relative movement between collar 4 and parts 2, 2a that after plunger 5 is withdrawn—but while collar 4 and consequently abutment ring 31 are still being detained by latch 33 and teeth 2b prevented from reaching teeth 25a—the parts 2, 2a can respond to spring 21 a limited distance in the clutching direction sufficient to put the friction plates 29 and 30 under compression and cause a friction pick-up of the driven member by the driving member, after which, releasing arm 33b of latch 33 will be lifted by stationary cam 35, control collar 4 and consequently abutment plate 31 will be released and the frictionally compressed parts responding as a unit to the urge of spring 21, will permit teeth 2b to intermesh with teeth 25a and establish positive drive. Conversely, when plunger 5 is permitted to return into the path of cam 4a, the frictional clutching members as a unit are thrown in the direction to unclutch the teeth 2b and 25a, and control collar 4 is locked off by latch 33. As this throw-out movement of the positively driven clutching member is imparted through the abutment plate 31, frictional drive continues while positive drive is being thrown out and until interrupted by a further functioning of the parts, namely, the passing of plunger 5 by cam 4a, and its encounter by friction releasing shoulder 36, which causes the parts to assume the relative positions shown in Figure 2, in which the parts 2, 2a, are being held out of drive by the plunger and to their outward limit relatively to the collar 4, friction plates 29, 30 are separated, and interruption of frictional drive has followed interruption of positive drive. By the riding of plunger 5 over cam 4a, collar 4 and abutment 31 move as a unit to push the friction clutch bodily away from driving member 25, a distance sufficient to disengage teeth 2b from teeth 25a of said driving member, thereby interrupting and permitting latch 33 to continue the interruption of positive drive. But this does not affect frictional drive, and so rotation continues through a fraction of a revolution until cam 4a on collar 4 passes and block 36 on driven member sleeve 2a encounters the plunger whereupon said sleeve, being yieldingly sustained by spring 21, is pushed back a slight distance further, by the plunger, relatively to the collar 4, (already at its limit) and this takes frictional driving pressure from the plates 29 and 30, so that interruption of drive is complete. As shown in both Fig. 4 and Fig. 7, there is sufficient clearance between the members 2a and 4 to permit this relative movement to take place.

Upon retraction of plunger 5, the lost motion between parts 2a and 4 is reversed under pressure of spring 21; frictional drive is reestablished by said spring pressing plates 29 and 30 together; the driven members 2a and 4 again rotate (as a unit); latch 33 is released by cam 34; spring 21, thereby released to further action, moves the now functioning friction clutch bodily to reengage teeth 2b with teeth 25a, and positive drive again exists.

The sequence of establishing first frictional and then positive drive, and the sequence of interrupting first positive and then frictional drive occur, each, in a part of a revolution of the driven portion of the clutch. In the former sequence, the frictional elements are put under compression immediately that the plunger is withdrawn (which also takes off the brake, Fig. 1). Establishment of positive drive ensues as soon as the driven members are frictionally picked up and execute the portion of a revolution sufficient to bring the collar-latch to its tripping cam. In the latter sequence, positive disengagement is complete by the time the plunger 5, which can enter only at the lowest or neutral point of cam 4a, is encountered by the salient of said cam; and release of the friction elements follows immediately upon release of the cam 4a and encounter of the plunger by the shoulder block 36.

To interrupt the drive, pressure of the foot upon the pedal or the otherwise imposed pull upon the rod 9 is released, or, if the detent 10 has been pulled out to establish indefinite drive, said detent is pushed in; whereupon plunger 5 resumes its position in the path of the cam 4a on collar 4, as shown in Figure 4, and immediately displaces the collar to the left in said figure and simultaneously displaces member 2 to the left by means of tension bolts 32 pulling against abutment 31 and friction plates 29 and 30, thereby moving the frictionally engaged clutch elements as a unit and withdrawing teeth 2b from teeth 25a, whereupon positive drive will be interrupted, latch 33 will be moved to the left far enough to drop into the keeper 34 (Fig. 7) and interruption of said positive drive will be continued. Frictional drive will, however, still remain and will insure continuance of rotation of the driven parts until plunger 5 encounters the shoulder 36 mounted upon sleeve 2a and having a limited movement therewith independently of the collar 4; whereupon the right-hand frictional plate abutment 31, being now stationary, the left-hand friction plate abutment 2 will be moved to the left by plunger 5 a distance sufficient to relieve driving friction among the plates, friction drive will thus be terminated and the driven member will come to rest with the parts in the relative positions shown in Figure 2 and so remain until plunger 5 is drawn downward from the position shown; whereupon shoulder 36, sleeve 2a and abutment 2, standing under the influence of spring 21, will move to the right until the friction plates are put under compression (right-hand abutment 31 being still sustained by member 4 and latch 33), whereupon frictional drive will be reestablished, and rotation of member 4 under such drive will bring the latch 33 into tripping engagement with stationary cam 35, thus permitting all of the axially movable clutching parts to move to the right as a unit and reestablish engagement between the positive drive teeth 2b and 25a and reestablish positive drive, which will continue until the plunger 5 is returned into the path of cam 4a and shoulder 36 and repeats the operation of interrupting the positive and frictional drives successively and brings the driven parts to a state of rest, as before described.

From the foregoing description, it will be seen that the preferred embodiment of the invention selected for illustration contemplates a frictional pick-up or synchronizing drive as an adjunct to a positive or interlock drive as a clutching means between driving and driven machine elements; that the frictional drive is established by compression of the friction elements between a temporarily stationary abutment and a temporarily movable compression member which, upon attainment of the pick-up and synchronizing function, automatically moves as a unit to establish the positive drive; that in establishing the intermesh of positive drive the same spring which puts the friction elements under compression is utilized to impart the unit movement which establishes the positive drive; that as an incident to the establishment of positive interlock the friction drive is eased off sufficiently to permit the positively interlocking elements to execute a sufficient circumferential displacement, one relatively to the other, to permit the meshing of their teeth; and that in interrupting the drive the control collar, under the displacing influence of the trip plunger, first withdraws the positive drive and then is forced to engage with a portion of the combined positively driven and compression member to open the friction drive simultaneously with releasing the collar to relieve the abutment of said friction drive.

An important advantage arising from the arrangement herein disclosed, wherein a single driving element 25 on the constantly running member 27 has two different types of clutching connection with the driven member or with two different driven members on one and the same shaft, is that such an arrangement affords opportunity for the introduction of shear pin connection between the driving element and the constantly running member which carries it, which shear pin connection will be protective of the mechanism with respect to either of said clutching connections; and especially is this advantageous when the driving element is radially remote from the center of revolution so that the load transmitted through the shear pins is materially lessened from what it would be if it were necessary to introduce it at a point nearer the hub of the constantly running member. Accordingly, another feature of the present invention consists in forming the driving element 25 as a separate cylindrical piece and with a connecting flange 37 clamped without restriction with respect to circumferential movement by means of plate 38 but held against rotation relatively to the driving member 27 by any suitable number of shear pins 39 passing through the web of the flywheel and through the said flange, with or without the interposition of bushing members 40 and 41, as circumstances may require. With such an arrangement, in the event of an insuperable resistance to the operation of the punch press or other machine driven by the clutch herein described, and whether said resistance be imposed through the non-positive or frictional clutch or through the positive or toothed clutch, the cylindrical driving member 25 may, by shearing the pin or pins 39, release itself and avoid breakage of the parts.

This clutch is designed to embody the advantages of friction clutches which are specially adapted for high speed machinery but are not satisfactory for slow speed work due to slippage. This clutch also embodies the advantages of positive clutches which are adapted for low speed heavy duty work, but which are unsatisfactory for high speeds due to the hard impact upon engagement. In other words, this clutch is adapted for both high and low speed application. Another feature of the present clutch pertains to the positive locking of the driving and driven members in both directions of rotation, which is accomplished by the intermeshing of the driving teeth without backlash.

We claim:

1. In a clutch, a driving member, a driven member, a non-positive clutching means comprising frictional motion transmitting elements connected, respectively, with said driving and driven members and movable relatively to each other in establishing frictional drive between said members and also movable as a unit after being thrown into driving position and while maintaining their frictional drive, and, positive clutching means thrown into driving position by the unit movement of the non-positive clutching means, means normally holding the positive clutching means from driving relation, and coacting elements for releasing said holding means mounted one upon the driven member and the other upon a stationary part of the machine and brought into releasing coaction by the frictionally imparted rotation of the driven member.

2. A clutch as described in claim 1, in which the non-positive frictional motion transmitting elements have a spring forcing them together to cause such transmission, and in which the positive clutching means moves into driving position under the influence of the same spring.

3. In a clutch, driving and driven members, frictional clutch elements adapted to establish drive from one of said members to the other, a compression member adapted to force said frictional elements together, a spring for forcing said compression member in the direction to establish frictional drive, positive clutching means controlled by said compression member and adapted to be brought into driving position by an additional movement of said compression member in the direction of compressing the frictional elements, an abutment for the frictional elements, and a latch normally restraining said abutment during initial compression but releasable to permit the frictional elements and their compression member to move as a unit and thereby place the positive clutching means in driving position; said abutment, when released to permit movement of the frictional clutching means, having an amplitude of movement which permits it to relieve the frictional elements of driving compression.

4. A clutch as described in claim 3, in which the abutment, when released to permit movement of the frictional elements as a unit, has an amplitude of movement after establishing positive drive, which permits it to relieve the frictional elements of driving compression.

5. In a clutch, driving and driven members, frictional clutching means adapted to establish drive between said members, a positive clutching means also adapted to establish drive between said members, a spring normally tending to throw each of said clutching means into driving position, a restraining means limiting the throw of the spring and preventing inter-engagement of the positive clutching means while permitting compression of the frictional clutching means, and means releasing said restraining means after a predetermined movement of the driven member by the frictional clutching means, at which time said members move at approximately synchronous speed.

6. A clutch as described in claim 5, in which the restraining means comprises a detent having a releasing projection and a cam in the path of said projection and adapted to displace the same to withdraw the detent and permit the positive clutching means to move into driving position.

7. In a clutch, driving and driven members, a non-positive clutching means interposed between said members, a positive clutching means also interposed between said members, means normally tending to move both of said clutching means in the direction to establish driving position of each thereof, a cam adapted to move both of said clutching means in the opposite direction and disengage the positive clutching means without releasing the non-positive clutching means, and means voluntarily movable into coaction with said cam to cause it to impart said movement in the opposite direction; said cam having a relative movement that causes it to release said voluntarily movable means; and said voluntarily movable means, when so released by the cam, moving into releasing cooperation with the non-positive clutching means.

8. In a clutch, a driving member, a first driven member, non-positive clutching means between said driving member and said first driven member, a second driven member, positive clutching means interposed between said driving member and said second driven member, said second driven member being movable into and out of driving position in the direction of the axis of the clutch, a controlling collar adapted to impart longitudinal movement to the second driven member, camming means adapted to impart movement to said collar in the direction to withdraw the second driven member in the direction to open the positive clutching means, a voluntarily insertable member coacting with said camming means, and means carried by said second driven member also adapted to enter into cooperation with said insertable member to hold the second driven member independently of said collar.

9. In a clutch, a driving member, first and second driven members, frictional clutching means and positive clutching means interposed between said driving member and the respective driven members, both of said clutching means being movable into and out of driving position, a collar having connections through which it supports the frictional clutching means in driving position, connections through which said collar withdraws the positive clutching means from driving position, a cam controlling said collar, and a tripping plunger cooperating with said cam to move the collar in the direction to withdraw the positive clutching means; said tripping plunger entering into engagement with the second driven member upon completion of its traverse of the cam and thereby, while the positive clutching means is retracted, causing release of the frictional clutching means.

10. In a clutch, a driving member, first and second driven members, frictional clutching means and positive clutching means interposed between said driving member and the respective driven members, an abutment for the frictional clutching means, a control collar connections between said collar and said abutment to sustain the frictional clutching means under driving compression and through which movement is imparted to the abutment together with the frictional clutching means and the positive clutching means bodily and in the direction to remove said positive clutching means from driving position, a tripping plunger adapted to enter the path of said collar and cause it to impart said bodily movement and thereby open the positive drive, a latch for holding said positive drive open, and a shoulder displaceable to relieve compression upon and interrupt frictional drive, said shoulder being engaged by the plunger and imparting such displacement after the collar passes the plunger and while the positive drive is latched in open position.

11. In a clutch, a driving member, a shaft carrying first and second driven members, frictional clutching means between the driving member and the first driven member adapted to be put into driving position by compression, said second driven member carrying a positive clutching means and having an axial movement by which it imposes compression upon the frictional clutching means and moves the positive clutching means into driving position, an abutment opposing pressure upon the frictional clutching means and preventing the second driven member from reaching positive driving position, a releasably detained control collar rotating with the shaft having connections through which it sustains said abutment, but adapted to move in one direction to yield said abutment to the pressure of the second driven member and permit the latter to place its positive clutching means in driving position and movable in the opposite direction to force the frictional clutching means and the second driven member in the direction of withdrawal of the positive clutching means from driving position, voluntarily controlled means insertable into the path of the collar to impart the last-named movement thereto, and a shoulder on the second driven member which also encounters said voluntarily controlled means to interrupt frictional drive; said voluntarily controlled means, by encountering the collar and shoulder successively, causing the withdrawal of the positive clutching means, followed by the opening of the frictional drive and thereby permitting the shaft to come to rest.

12. In a clutch, a driving member, first and second driven members, frictional clutching means and positive clutching means interposed between said driving means and the respective driven members, resilient means normally tending to move both said frictional clutching means and said positive clutching means in the direction to establish driving position thereof, a control collar adapted to move both of said clutching means in the opposite direction, means voluntarily movable into coaction with said control collar to cause it to impart said opposite movement, and a latch associated with said control collar for restraining movement of the collar to prevent engagement of the positive clutching means while permitting engagement of the frictional clutching means.

13. In a clutch, driving and driven members, a non-positive clutching means interposed between said members, a positive clutching means also interposed between said members, a spring normally tending to move both the said clutching means in the direction to establish driving position thereof, a cam adapted to move both of said clutching means in the opposite direction, means voluntarily movable into coaction with said cam to cause it to impart said opposite movement, a latch associated with said cam and normally holding the same in position with the positive clutching means out of engagement, and means for releasing the latch after predetermined rotation of the cam has taken place to permit said positive clutching means under the action of said spring to move into driving position.

14. In a clutch, a driving member and a driven member, non-positive clutching means and positive clutching means between the members, said non-positive clutching means being designed to effect a driving connection between the members to bring the driven member into synchronous speed with the driving member, means on the driven member for automatically effecting connection of the members through the positive clutching means after a predetermined rotational displacement of said driven member, means including a brake associated with said driven member, and manually actuated means for successively disconnecting the positive clutching means and then the non-positive clutching means and for approximately simultaneously applying said brake upon the disconnection of the positive clutching means.

15. In a clutch, a driving and a driven member, frictional clutching means and positive clutching means interposed between said members, resilient means normally tending to move said frictional clutching means and said positive clutching means in a direction to establish driving position thereof, a control collar on said driven member adapted for movement in an opposite direction to disconnect said frictional and positive clutching means, a brake also associated with said driven member, a manually actuated tripping plunger movable into coaction with said control collar to cause the same to move in the direction to disconnect the clutching means, and connections between said tripping plunger and said braking means whereby withdrawing said tripping plunger releases said breaking means and insertion of said tripping plunger into coaction with the collar functions to apply said braking means.

16. In a clutch, a driving and a driven member, frictional clutching means and positive clutching means interposed between said members, resilient means normally tending to move both said frictional clutching means and said positive clutching means in a direction to establish driving position thereof, a control collar on said driven member adapted for movement in an opposite direction to disconnect said frictional and positive clutching means, a voluntarily actuated tripping plunger movable into coaction with said control collar to cause the same to move in said opposite direction, resilient means urging said tripping plunger into coaction with said control collar, and a detaining bolt associated with the tripping plunger for holding the same out of coacting relation with the collar, said detaining bolt being constructed and arranged whereby the same can be actuated in a direction to release said plunger to cause disconnection of the clutching elements by the thrust of the operator.

17. In a clutch, driving and driven members, a non-positive clutching means interposed between said members, a positive clutching means also interposed between said members, means normally tending to move both of said clutching means in the direction to establish driving position thereof, a cam adapted to move both of said clutching means in the opposite direction, means voluntarily movable into coaction with said cam to cause it to impart said opposite movement, and a releasable latch through which said cam is held in position to restrain the positive clutching means from driving position.

18. In a clutch, driving and driven members, a non-positive clutching means interposed between said members, a positive clutching means also interposed between said members, means normally tending to move both of said clutching means in the direction to establish driving position thereof, a cam adapted to move both of said clutching means in the opposite direction, a voluntarily insertable tripping member adapted to cooperate with the cam and develop a movement in the cam which withdraws the positive clutching means from previously established driving position, and an automatically releasable latch that holds it against return to said position.

19. A clutch as described in claim 1, in which both the non-positive clutching means and the positive clutching means are normally under the influence of means tending to force them respectively into driving relation; and the means which normally holds the positive clutching means from driving relation leaves the non-positive driving means free to move into driving relation.

20. A clutch as described in claim 1, in which the non-positive clutching means also includes a compression element having spring-induced axial movement upon the driven member of the clutch, and an abutment element between which and said compression element the frictional motion-transmitting elements are compressed in establishing the non-positive drive of the clutch; and the positive clutching means includes driving and driven interlocking elements united respectively with the driving member of the clutch and the said compression element and brought into interlock by the spring-induced axial movement of the compression member relatively to the driving member of the clutch; the means which normally holds the positive clutching means out of driving relation acting to oppose that portion of the spring-induced movement of the compression member which interlocks the positive clutching means while permitting that portion of said movement which compresses the frictional elements and maintains non-positive drive.

21. A clutch as described in claim 1, in which the non-positive clutching means includes an abutment element which sustains the frictional motion-transmitting elements in driving relation; and the means normally holding the positive clutching means from positive driving position is connected to and acts through said abutment element to hold the positive driving elements apart without preventing the relative movement that establishes non-positive drive.

22. In a clutch, a driving member, a shaft to be driven thereby, first and second driven members each connected to said shaft, non-positive clutch means and positive clutch means adapted to transmit motion from the driving member to said shaft through the first and second driven members, respectively, and adapted to assume and to be retracted from drive-transmitting position each independently of the other, means rotating with the shaft for retracting and releasably retaining the positive clutch means, means rotating with the shaft for interrupting the drive of the non-positive clutch means, a voluntarily introduced control means encountering, in the order named, the positive clutch retracting means to interrupt positive drive, and then the non-positive interrupting means and thereby permitting the shaft to be brought to a stop, the said non-positive clutch means automatically resuming driving position upon withdrawal of said control means and by such resumption of drive, synchronizing revolution of the driving and driven members while the positive clutch means remains retracted, and means timed by the rotation of the driven shaft for releasing the retracted positive clutching means and permitting it to resume transmitting position during synchronizing drive of the non-positive clutch means.

FREDERICK M. LITTELL.
RUDOLPH A. SKRIBA.